Oct. 30, 1923.  1,472,463
A. J. EAVES
TELEGRAPH REPEATING SYSTEM
Filed April 30, 1921
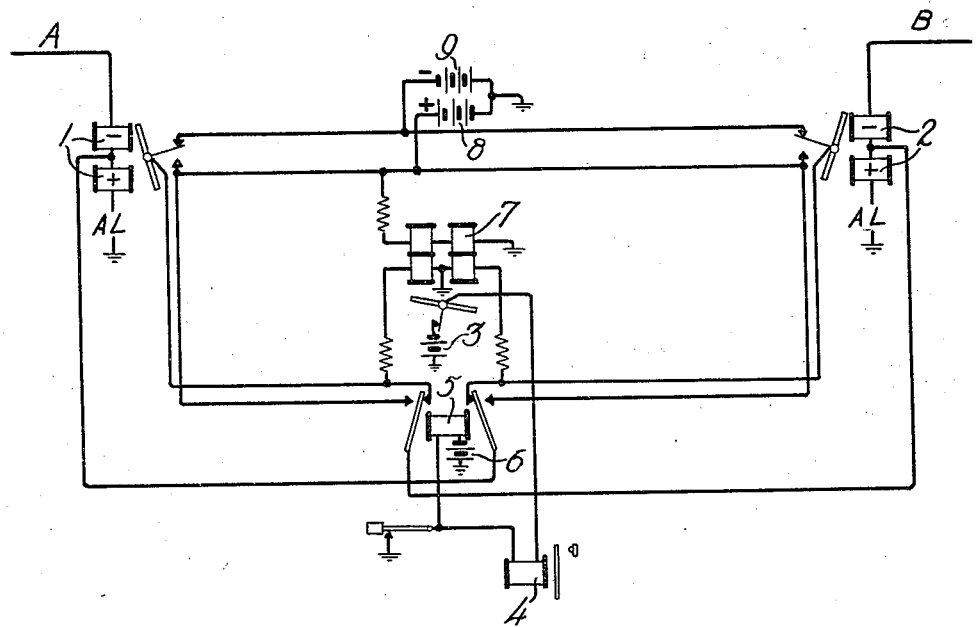
Inventor:
Augustus J. Eaves.
by Joel CR. Palmer Atty.

Patented Oct. 30, 1923.

1,472,463

UNITED STATES PATENT OFFICE.

AUGUSTUS J. EAVES, OF NEW YORK, N. Y., ASSIGNOR TO WESTERN ELECTRIC COMPANY, INCORPORATED, OF NEW YORK, N. Y., A CORPORATION OF NEW YORK.

TELEGRAPH REPEATING SYSTEM.

Application filed April 30, 1921. Serial No. 465,671.

*To all whom it may concern:*

Be it known that I, AUGUSTUS J. EAVES, a citizen of the United States, residing at New York, in the county of New York, State of New York, have invented certain new and useful Improvements in Telegraph Repeating Systems, of which the following is a full, clear, concise, and exact description.

This invention relates to telegraph repeating systems and more particularly to repeating systems operated according to the half-duplex method.

It is an object of this invention to provide a half-duplex telegraph repeating system which is simple in construction, efficient in operation and cheap in cost, the maintenance expense being reduced to a minimum.

In direct point duplex telegraph repeaters the present practice is to place a polarized relay in a high resistance leak circuit which runs from the armature of the line relay to the ground in ground return circuits, or to the center of the battery in metallic return circuits. This relay serves to operate a sounder which enables the attendant to read the passing signals, or to repeat signals to a subscriber, as shown and described in Patent No. 1,353,464, issued September 21, 1920.

In standard half-duplex operation a polarized relay is required for each side of the repeater, but during transmission only one relay is in use at a time. In accordance with its object, the present invention contemplates employing a three-winding polarized relay so connected as to serve the purpose of the present two leak relays.

The invention will be better understood from a consideration of the following description taken in connection with the accompanying drawing in which only so much of a telegraph system has been shown as will be necessary to a clear understanding of the features of the system.

Referring to the drawing, two main line sections A and B terminate in respective duplex networks comprising polar relays 1 and 2 and associated artificial lines AL. A battery 3 supplies current to the sounder 4 which is adapted to receive messages from either line A or line B. In order that the repeater station may signal outlying stations, the transmitting relay 5, energized by the battery 6, is connected in circuit with the sounder 4 and is grounded at the same point. The differentially wound three-winding polarized relay 7 is here shown connected to the two leak circuits which run, respectively, from the armatures of line relays 1 and 2 to ground. The positive pole of the battery 8 is permanently connected to the uppermost winding of the relay 7, steadily energizing this winding with current of positive polarity. The positive pole of the battery 8 may also be selectively connected, through the armatures of relays 1 and 2, to either of the two lowermost balanced windings, according to the direction of the current in the main line. The negative pole of the battery 9 may be selectively connected through the armatures of line relays 1 or 2 to either or both the lowermost windings of the relay 7. Thus, the three-winding polarized relay 7 has one winding steadily energized by current of a definite polarity and two windings adapted to be energized by current of varying polarity controlled by the line relays 1 and 2.

When line relays 1 and 2 are at rest, as shown in the drawing, an equal amount of negative current flows from the battery 9 through the two lowermost balanced windings of the relay 7. There is also an opposing positive current of the same amplitude flowing through the uppermost winding from the battery 8, which neutralizes the magnetic effect of one leak winding. The resultant is a current of negative polarity equal to the ampere turns of one leak winding, which tends to bias the armature of the relay 7 to connect the sounder 4 to the battery 3, producing a marking effect. If the current on line B is reversed, the armature of the relay 2 moves over to the positive or spacing contact, thereby connecting positive current from the battery 8 to the line A and to one of the lowermost windings of the relay 7. When this condition obtains, the magnetic effect of the two lowermost or leak windings oppose and neutralize, leaving the current in the third winding to attract the armature to the opposite or spacing contact, disconnecting the source of current 3 from the sounder 4. The same condition prevails when the current in line A is reversed. It is, therefore, obvious that the three-winding polarized relay will respond to reversals of current from either line relay and repeat signals to a local circuit, thereby eliminating one polarized relay in half-duplex operation.

What is claimed is:

1. In a telegraph system, a line conductor divided into sections, repeating means intermediate such sections for relaying impulses from one line section to another including a relay common to both of said line sections and responsive to impulses transmitted thereover, and means controlled by said relay for giving an audible indication of the impulses relayed from one line section to the other.

2. In a telegraph system, a line conductor divided into sections, repeating means interposed between such line sections for relaying impulses from one section to another including a differentially wound relay common to both of said line sections and responsive to impulses transmitted thereover, and an electromagnetically operated device controlled by said relay for giving a distinctive manifestation of the impulses relayed from one line section to another.

3. In a half duplex telegraph system, a line conductor divided into sections, repeating means intermediate such line sections for relaying impulses from one section to another including a relay common to both of said line sections and responsive to impulses transmitted thereover, a local circuit controlled by said relay, and a sounder included in said local circuit and responsive to the operation of said relay for giving an audible indication of the impulses relayed from one line section to another.

In witness whereof I hereunto subscribe my name this 28th day of April, A. D., 1921.

AUGUSTUS J. EAVES.